United States Patent
Gomi et al.

(10) Patent No.: US 8,356,681 B2
(45) Date of Patent: Jan. 22, 2013

(54) FRICTIONAL DRIVE DEVICE AND INVERTED PENDULUM TYPE VEHICLE USING THE SAME

(75) Inventors: Hiroshi Gomi, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 12/916,793

(22) Filed: Nov. 1, 2010

(65) Prior Publication Data

US 2011/0115279 A1 May 19, 2011

(30) Foreign Application Priority Data

Nov. 16, 2009 (JP) ................................. 2009-260910

(51) Int. Cl.
*B60K 17/30* (2006.01)
(52) U.S. Cl. ............................. 180/21; 180/7.1; 180/20
(58) Field of Classification Search .................... 180/21, 180/7.1, 20
See application file for complete search history.

(56) References Cited

U.S. PATENT DOCUMENTS

| 2010/0096905 | A1 | 4/2010 | Takenaka et al. | |
|---|---|---|---|---|
| 2010/0139996 | A1* | 6/2010 | Takenaka et al. | 180/20 |
| 2011/0209932 | A1* | 9/2011 | Takenaka et al. | 180/15 |

FOREIGN PATENT DOCUMENTS

WO 2008/132779 A1 11/2008

* cited by examiner

*Primary Examiner* — Kevin Hurley
(74) *Attorney, Agent, or Firm* — Carrier Blackman & Associates, P.C.; Joseph P. Carrier; William D. Blackman

(57) ABSTRACT

In a frictional drive device comprising a pair of drive disks (48) each rotatably supported by a frame (10) around a central axial line (A) in a mutually opposing relationship and configured to be individually rotatively actuated by a pair of first actuators (45), a plurality of drive rollers (58) arranged along an outer periphery of each drive disk each via a roller bracket (52) which is rotatable around a center line (B) extending in a radial direction at an angle with respect to the central axial line of the drive disks, each roller bracket rotatably supports the corresponding drive roller so as to be rotatable along a prescribed plane of rotation, and an annular main wheel (100) disposed at least approximately coaxially with respect to the central axial line and engaged by the drive rollers of the drive disks, the main wheel comprising an annular member (102) and a plurality of driven rollers (106) supported along the annular member so as to be rotatable around a tangential line of the annular member, each drive roller is configured to be selectively turned around the center line of the corresponding roller bracket. Thereby, the drive efficiency of the frictional drive device can be improved over a wide range of drive mode. When the frictional drive device is incorporated in an inverted pendulum type vehicle as a drive unit (40), the variable arrangement for the drive rollers can be conveniently used for imparting a yaw moment to the vehicle.

8 Claims, 6 Drawing Sheets

FRICTIONAL DRIVE DEVICE AND INVERTED PENDULUM TYPE VEHICLE USING THE SAME

TECHNICAL FIELD

The present invention relates to a frictional rive device and an inverted pendulum type vehicle using the same as a drive unit.

BACKGROUND OF THE INVENTION

Known is an inverted pendulum type vehicle or an omni-directional vehicle incorporated with a frictional drive device which comprises a pair of drive assemblies individually actuated by electric motors and a main wheel held between the drive assemblies and frictionally driven by the drive assemblies. See WO2008132779A1 (US20100096905A1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

In such a vehicle, the force that the drive rollers apply to the driven rollers includes a component that turns the main wheel carrying the driven rollers around the central axial line of the main wheel and a component that turns the individual driven rollers around their respective central lines. The ratio of these two components of force is determined by the angular relationship of each drive roller with respect to the axial center line of the main wheel. This angular relationship characterizes the skewed relationship between the axial center line of the main wheel and axial center line of each drive wheel. This angular relationship may be represented by the angle between the intersection line of the contact surface between two lines; one of the lines being the intersection line defined the contact surface between the rive roller and driven roller and the plane of rotation of the drive roller, and the other line being the central axial line of the driven roller projected onto the aforementioned contact plane. This angle is called as a skew angle $\theta$ in the following description.

The skew angle $\theta$ is zero when the speed vectors of the drive roller and driven roller at the contact surface between them is perpendicular to each other, and is 90 degrees when the two speed vectors are parallel to each other. The smaller the skew angle is, the smaller the ratio of the rotational speed of the driven roller to the difference in the rotational speed between the two drive disks becomes. Conversely, as the skew angle approaches the 90 degree angle, the greater the ratio becomes. If there is no slippage between the drive roller and driven roller, in theory, the ratio becomes infinite when the skew angle is 90 degrees. However, in reality, the maximum value of the ratio is reached when the angle is somewhat smaller than 90 degrees.

An inverted pendulum type vehicle using such a frictional drive device is enabled to travel in the fore and aft direction by the rotation of the main wheel around the central axial line thereof, and the drive efficiency at such a time can be optimized by setting the skew angle close to zero. The vehicle is enabled to travel laterally by the rotation of the individual drive rollers around the respective center lines thereof or the tangential lines of the main wheel, and the drive efficiency at such a time can be optimized by setting the skew angle close to the 90 degree angle.

Thus, the drive efficiency of a frictional drive device of the aforementioned type can be optimized by setting different skew angles depending on the drive mode of the frictional drive device. The same is true with an inverted pendulum type vehicle using such a frictional drive device for a drive unit thereof. The drive efficiency of the vehicle can be optimized by setting different skew angles depending on the drive mode of the vehicle.

BRIEF SUMMARY OF THE INVENTION

Based on such a recognition by the inventor, a primary object of the present invention is to provide a frictional drive device that can maintain a high drive efficiency under all drive conditions.

A second object of the present invention is to provided an inverted pendulum type vehicle using a frictional drive device that can maintain a high drive efficiency under all drive conditions.

According to the present invention, such objects can be accomplished by providing a frictional drive device, comprising a frame; a pair of drive disks each rotatably supported by the frame around a central axial line in a mutually opposing relationship; a pair of first actuators supported by the frame for individually rotatively actuating the drive disks; a plurality of drive rollers arranged along an outer periphery of each drive disk each via a roller bracket which is rotatable around a center line extending in a radial direction at an angle with respect to the central axial line of the drive disks, each roller bracket rotatably supports the corresponding drive roller so as to be rotatable along a prescribed plane of rotation at a certain angular relationship with the central axial line; an annular main wheel disposed at least approximately coaxially with respect to the central axial line and engaged by the drive rollers of the drive disks, the main wheel comprising an annular member and a plurality of driven rollers supported along the annular member so as to be rotatable around a tangential line of the annular member; and a pair of second actuators configured to selectively turn each drive roller around the center line of the corresponding roller bracket.

By thus variably adjusting the angular positioning of each roller bracket around the center line thereof by using the second actuators, the drive rollers are allowed to engage the corresponding driven rollers at an optimum skew angle all times. Thereby, the drive efficiency of the frictional drive device can be improved over a wide range of drive mode. When the frictional drive device is incorporated in an inverted pendulum type vehicle as a drive unit, the variable arrangement for the drive rollers can be conveniently used for imparting a yaw moment to the vehicle.

According to a first aspect of the present invention, each second actuator comprises a cam member supported by a part of the frame, a cam follower member moveably supported by the corresponding drive disk and engaging a cam profile of the cam member, and a mechanism for converting a camming movement of the cam follower member into a rotational movement of the roller bracket around the center line thereof.

In this embodiment, the angular position of the roller bracket around the center line can be changed in dependence on the rotational movement of the roller bracket around the central axial line of the drive disks. This allows the angular position of the roller bracket around the center line to be changed without requiring a separate power source. Also, this embodiment is particularly suitable for imparting a yaw moment to the vehicle when applied as a drive unit of the vehicle.

If each second actuator comprises a powered cam actuator for selectively moving the cam member, the freedom in the mode of operation of the frictional drive device can be increased. According to a preferred embodiment of the present invention, the mechanism of each second actuator comprises a pinion fixedly attached to the roller bracket and a rack member connected to the cam follower member and provided with gear teeth meshing with the pinion. The cam profile may be configured such that each drive roller is turned around the center line thereof as the drive roller passes a part of the main wheel engaging an object to be driven.

According to a second aspect of the present invention, each second actuator comprises a ring gear member coaxially and rotatably supported by the corresponding drive disk, a pinion fixedly attached to the roller bracket and meshing with gear teeth of the ring gear, and a ring gear actuator for causing a small relative rotation of the ring gear member with respect to the drive disk. The ring gear actuator may comprise a linear actuator supported by the frame in a coaxial relationship to the drive disk, and a slide member slidably supported by the drive disk in a slidable manner, and having a first end coupled to an output end of the linear actuator in an axially fast but mutually freely rotatable manner and a second end threadably engaged by a threaded central opening of the ring gear member.

BRIEF DESCRIPTION OF THE DRAWINGS

Now the present invention is described in the following with reference to the appended drawings, in which.

DETAILED DESCRIPTION OF THE PREFERRED EMBODIMENTS

The frictional drive device according to the present invention and the vehicle incorporated with the frictional drive device is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals may also be used without the suffix in the following description to denote such components collectively.

Figure 1:
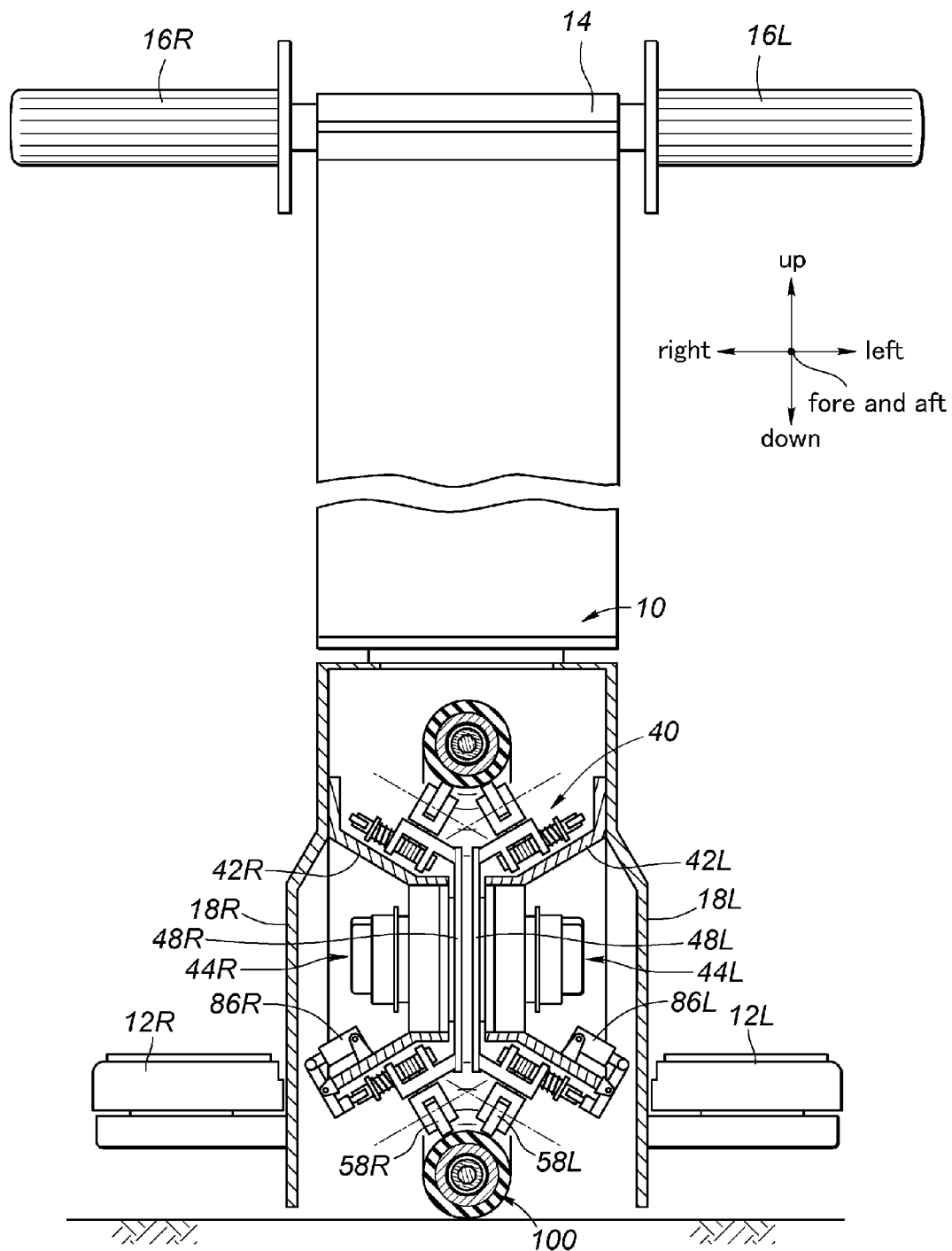
FIG. 1 is a sectional front view of an inverted pendulum type vehicle incorporated with a frictional drive device according to the present invention for a drive unit thereof.

Referring to FIG. 1, an inverted pendulum type vehicle 1 embodying the present invention comprises a columnar frame 10 having a drive unit 40 incorporated in a lower part thereof. A lower part of the frame 10 is provided with a pair of steps 12 extending from either side thereof, and an upper end of the frame 10 is provided with a handle bar 14 extending laterally from either direction. Each lateral end of the handle bar 14 is provided with a grip 16.

The drive unit 40 is configured as a unicycle drive unit, and is interposed between a pair of side walls 18 of a lower part of the frame 10. A control unit not shown in the drawings controls the operation of the drive unit 40 according to the output signals of a gyro sensor and a load sensor (not shown in the drawings) so that the frame 10 is maintained in an upright posture as an inverted pendulum type vehicle in operation and is enabled to travel in both a fore and aft and lateral direction.

Figure 2:
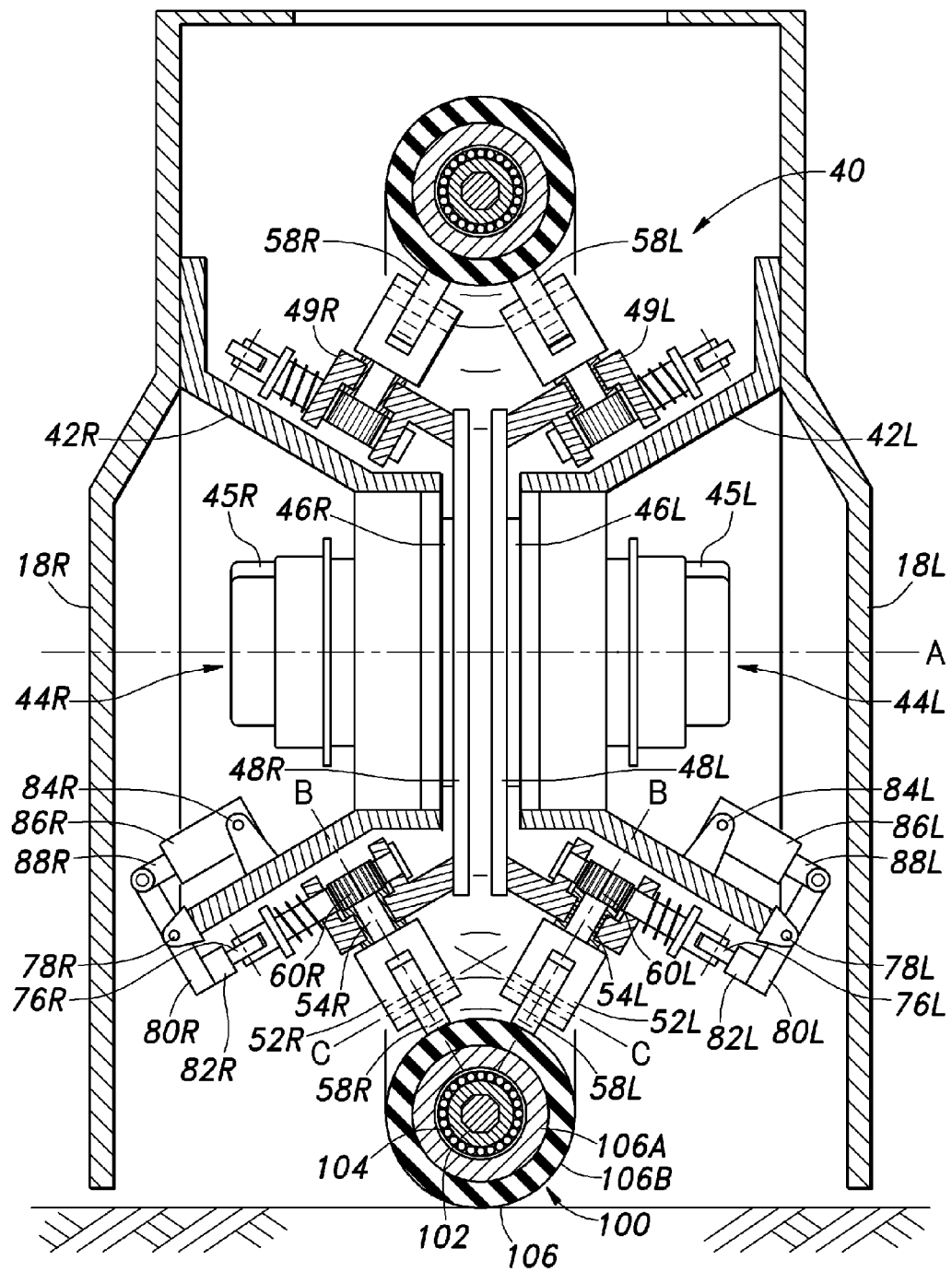
FIG. 2 is an enlarged sectional front view of the frictional drive device.

FIG. 2 shows the details of the drive unit 40. The drive unit 40 comprises a pair of mount members 42, each configured as a tapered hollow cylinder and fixedly attached to the corresponding side wall 18. The mount members 42 oppose each other in a coaxial relationship with the smaller ends thereof facing each other.

Each mount member 42 receives a drive assembly 44 including an electric motor 45 and a speed reduction unit. The drive assemblies 44 are respectively provided with output members 46 disposed in a mutually coaxial relationship with respect to a central axial line A. Each output member 46 supports a drive disk 48 in a coaxial relationship.

Figure 3:
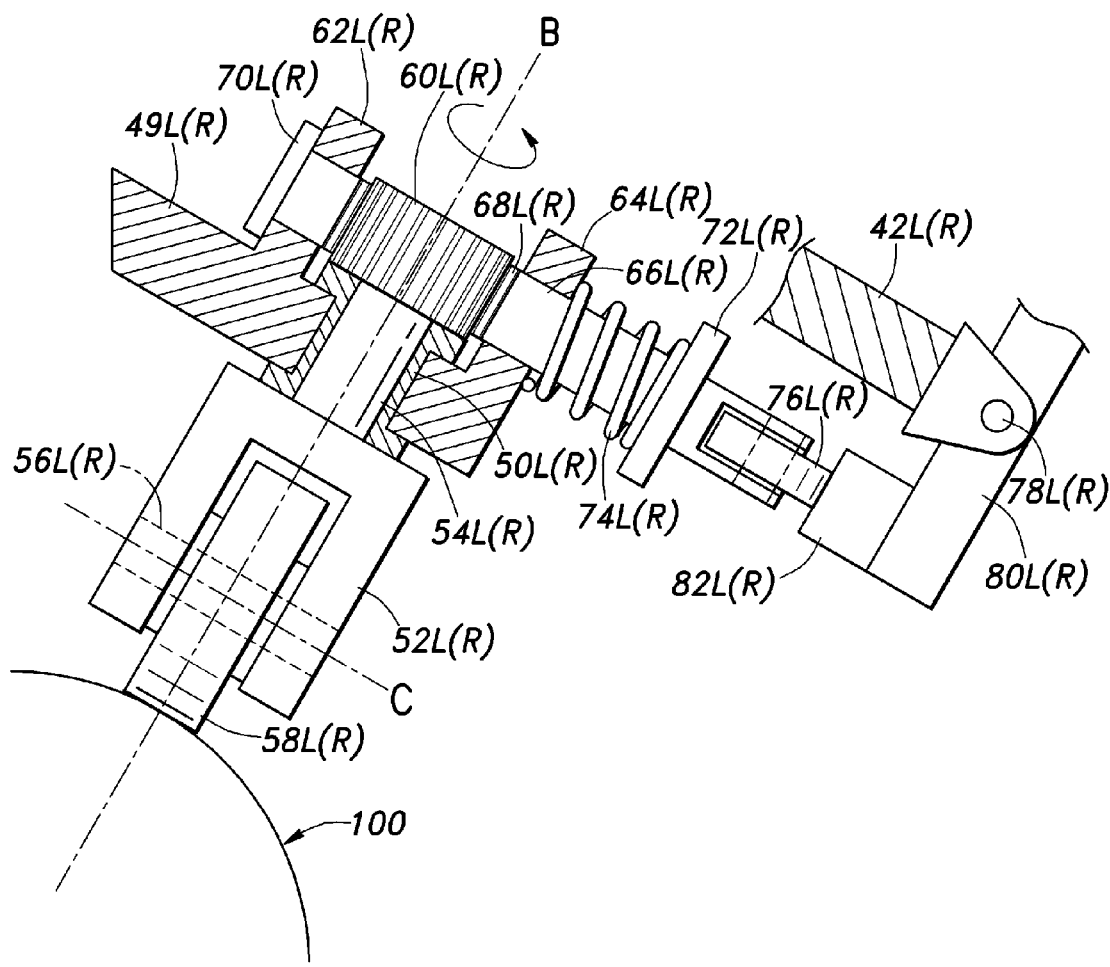
FIG. 3 is an enlarged fragmentary sectional front view of a mechanism for changing the skew angle of drive rollers.

The drive disk 48 is provided with a hollow frusto-conical section 49 in a coaxial relationship such that the two frusto-conical sections 49 oppose each other with the small ends thereof facing each other. The conical wall of each frusto-conical section 49 is formed with a plurality of through holes at a regular circumferential interval passed perpendicularly through the conical wall. As best illustrated in FIG. 3, each through hole is fitted with a bearing bush 50 which rotatably supports a rotary shaft 54 supporting a roller bracket 52. Thereby, each roller bracket 52 can rotate around a rotational center line B which is neither parallel not perpendicular to the central axial line A. As can be appreciated by a person skilled in the art, the drive disk 49 may not be provided with a hollow frusto-conical section 49 but may be freely configured as long as the plurality of roller brackets 52 may be supported along a circle concentric to the central axial line A in a rotation symmetric manner and each have a rotational center line B which is neither parallel not perpendicular to the central axial line A.

Each roller bracket 52 rotatably supports a drive roller 58 via a roller shaft 56 extending perpendicular to the rotary shaft 54 so that the plurality of drive rollers 58 are arranged on the frusto-conical section 49 of the drive disk 48 at a circumferentially regular interval in a rotation symmetric manner.

The end of the rotary shaft 54 opposite from the end supporting the drive roller 58 is formed with a pinion 60. On the side of the wall defining the frusto-conical section 49 opposite from the drive roller 58 is formed a support portion including a pair of upright walls 62 and 64 on either side of the pinion 60. The upright walls 62 and 64 support a slide member 66 formed with rack teeth 68 meshing with the pinion 60 so as to be slidable in a direction perpendicular to the central axial line B of the rotary shaft 54. In the illustrated embodiment, the slide member 66 extends along the generatrix line that defines the frusto-conical section 49 when rotated around the central axial line A.

Figure 4:
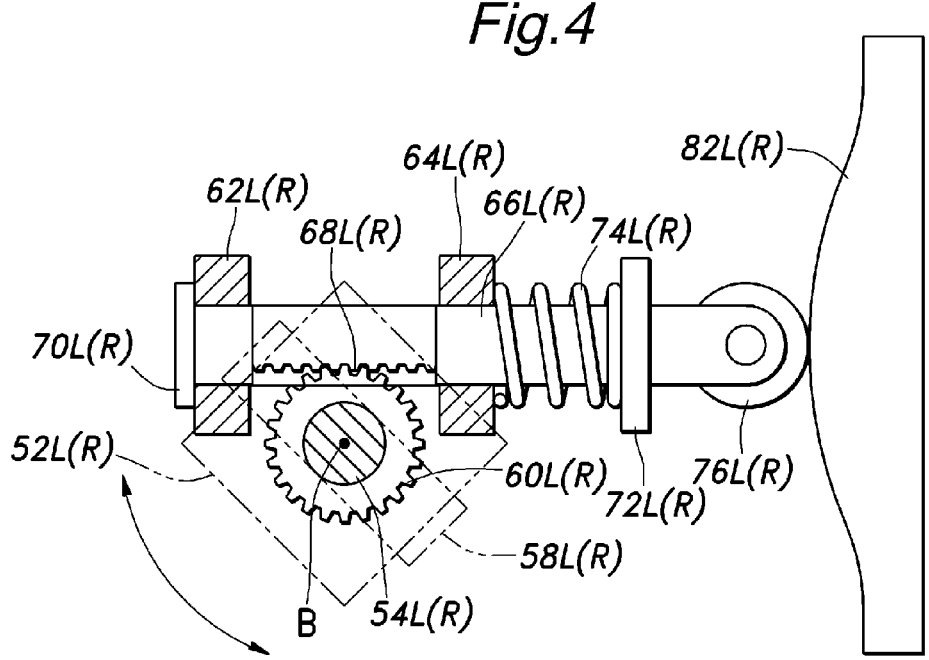
FIG. 4 is an enlarged fragmentary sectional plan view of the mechanism for changing the skew angle of the drive rollers.

Therefore, as illustrated in FIG. 4, when the slide member 66 is moved along the axial line thereof guided by the upright walls 62 and 64, the rotary shaft 54 is angularly displaced owing to the meshing of the rack teeth 68 with the pinion 60. This in turn causes the axial line C of the roller shaft 56 to change direction in a plane perpendicular to the rotary shaft 54 and the plane of rotation of the drive roller 58 around the axial line of the roller shaft 56 changes orientation in a corresponding manner as denoted by a angle θ (which is referred to as "skew angle" hereinafter) in FIG. 5.

The slide member 66 is provided with a first flange 70 that determine the limit of a sliding movement thereof by abutting the outer surface of one of the upright walls 62 and a second flange 72 that abuts an end of a compression coil spring 74 which is wound around the slide member 66 and has an opposite end engaged by the outer surface of the other upright wall 64. Thereby, the slide member 66 is urged in a direction to move outwardly away from the center of the drive assembly 40.

The end of the slide member 66 extending further out from the second flange 72 is provided with a cam follower roller 76 in a rotatable manner. A rocker arm 80 is pivotally supported 80 at an outer edge (or an edge of an opening passed through the wall) of a lower part of the mount member 42 via a pivot shaft 78, and has a first end fixedly carrying a cam member 82 and a second end connected to a plunger (output member) 88 of a linear actuator 86 attached to the inner surface of the wall of the mount member 42 via a bracket 84. Therefore, the cam follower roller 76 belonging to the drive roller 52 that has reached the lower most part of the trajectory thereof is engaged by the cam member 82.

In particular, as the cam follower roller 76 rides over a raised part of the cam member 82, the slide member 66 is pushed inward against the spring force of the compression coil spring 74. The linear actuator 86 and roller arm 80 are configured such that the cam member 82 may be displaced between two different positions along the axial line of the slide member 66 depending on the On-Off state of the linear actuator 86.

The two sets of drive rollers 58 supported by the right and left drive disks 48 oppose each other in a mirror image of each other, and jointly support a main wheel 100 in a coaxial or approximately coaxial relationship to the central axial line A from two sides. In particular, the main wheel 100 is held between the two sets of drive rollers 58 and is supported solely by the two sets of drive rollers 58 so as to be rotatably relative to the drive disks 48 in a coaxial relationship.

The main wheel 100 comprises an annular member 102 having a polygonal cross section, a plurality of inner sleeves 104 fixedly fitted on the annular member 102 along the circumferential length thereof and a plurality of driven rollers 105 each rotatably supported by the corresponding inner sleeve 104. Thus, each driven roller 105 is enabled to freely rotate around a tangential line of the annular member 102.

Each driven roller 105, which is configured to be engaged by the drive rollers 58, and to engage the road surface or the object to be actuated, includes a metallic sleeve 106A rotatably fitted on the corresponding inner sleeve 104 and a rubber sleeve 106B vulcanized on the outer circumferential surface of the metallic sleeve 106A. The rotation of each drive disk 48 can be transmitted to the main wheel 100 via the frictional engagement between the drive rollers 58 and driven rollers 105.

The numbers of the drive rollers 58 and driven rollers 105 and sizes of the individual drive rollers 58 and driven rollers 105 are determined such that the driven roller (or driven rollers) 106 engaging the road surface or the object to be actuated in the lower most part of the main wheel 100 is engaged by at least one of the drive rollers 58 of the right drive disk 48R and one of the drive rollers of the left drive disk 48L at all times. Thereby, at least the driven roller 105 engaging the road surface is given with a traction force by the relevant drive rollers 58.

The plane of rotation of each drive roller 58 is tilted with respect to the plane of rotation of the main wheel 100, and is neither parallel nor perpendicular to the central axial line A of the drive disks 48. The rotational center line C of each drive roller 58 is also in a skewed relationship to the central axial line A of the drive disks 58. Also, as each roller bracket 52 turns around the central axial line B of the rotary shaft 54, the orientation of the plane of rotation of each drive roller 58 which is represented by the skew angle θ changes orientation (see FIG. 5). The smaller the skew angle θ is, the smaller the ratio of the rotational angle of the driven roller 106 to the difference in the rotational speed of the two drive disks 48 becomes. Conversely, as the skew angle θ approaches the 90 degree angle, this ratio becomes greater.

Figure 5:
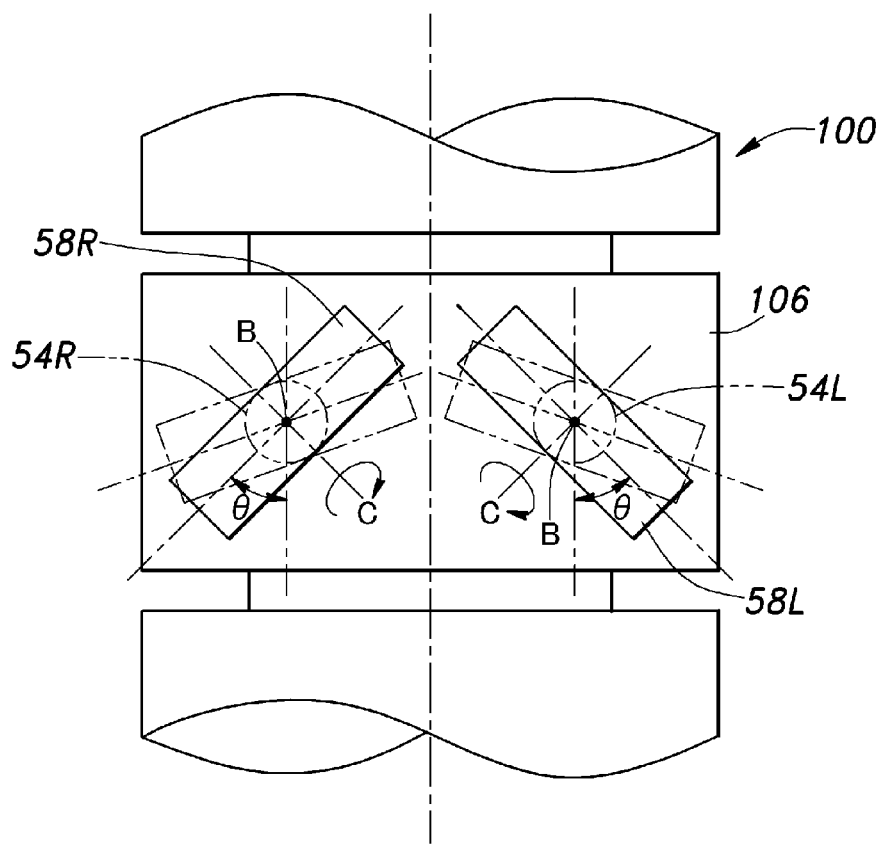
FIG. 5 is a diagram illustrating the definition of the skew angle.

In the illustrated embodiment, when the linear actuators 86 are energized, the left rocker arm 80L turns clockwise causing the corresponding cam member 82L to move leftward while the right rocker arm 80R turns counter clockwise causing the corresponding cam member 82R to move rightward. As a result, each rotary shaft 54L on the left drive disk 48L turns counter clockwise, and each rotary shaft 54R on the right drive disk 48R clockwise as seen in FIG. 5 so that the skew angle θ becomes smaller as compared to the case where the linear actuators 86 are not energized.

The rotational speed of each driven roller 106 is determined by the difference in the speed between the right and left drive disks 48 and the skew angle θ. For instance, when the two drive disks 46 are turned at the same speed in mutually opposite directions, the main wheel 100 does not rotate, but the driven rollers 106 rotate. Thereby, the driven rollers 106 produce a lateral drive force, and the main wheel 100 propels the vehicle in the lateral direction. When the two drive disks 46 are turned at the same speed in a same direction, the main wheel 100 rotates around the central axial line A, but the driven rollers 106 do not rotate. Thereby, the driven rollers 106 produce a fore and aft drive force, and the main wheel 100 propels the vehicle in the fore and aft direction.

By thus individually controlling the rotational speeds and rotational directions of the two drive disks 48 by using the corresponding electric motors 45, the inverted pendulum type vehicle is enabled to travel in any desired direction.

Furthermore, by changing the skew angle θ, the drive efficiency can be improved for the given ratio of the rotational speed of the main wheel 100 to the rotational speed of the drive rollers 106 or the given traveling direction. If the linear actuators 86 are capable only of an On-Off control, the skew angle θ can be adjusted in two stages. If the linear actuators 86 are configured for a proportional or continuous displacement, the skew angle θ can be adjusted continuous over a prescribed range.

By suitably selecting the shape of the cam profile of each cam member 82, the skew angle of each drive roller 58 can be changed as the drive roller 58 moves along the path thereof at the lower most part of the main wheel 100. Typically, the skew angle of each drive roller 58 increases as the drive roller 58 approaches and passes the lower most point of the main wheel 100, and then again decreases as the drive roller 58 moves away from a point somewhat ahead of the lower most point of the main wheel 100.

Figure 6:
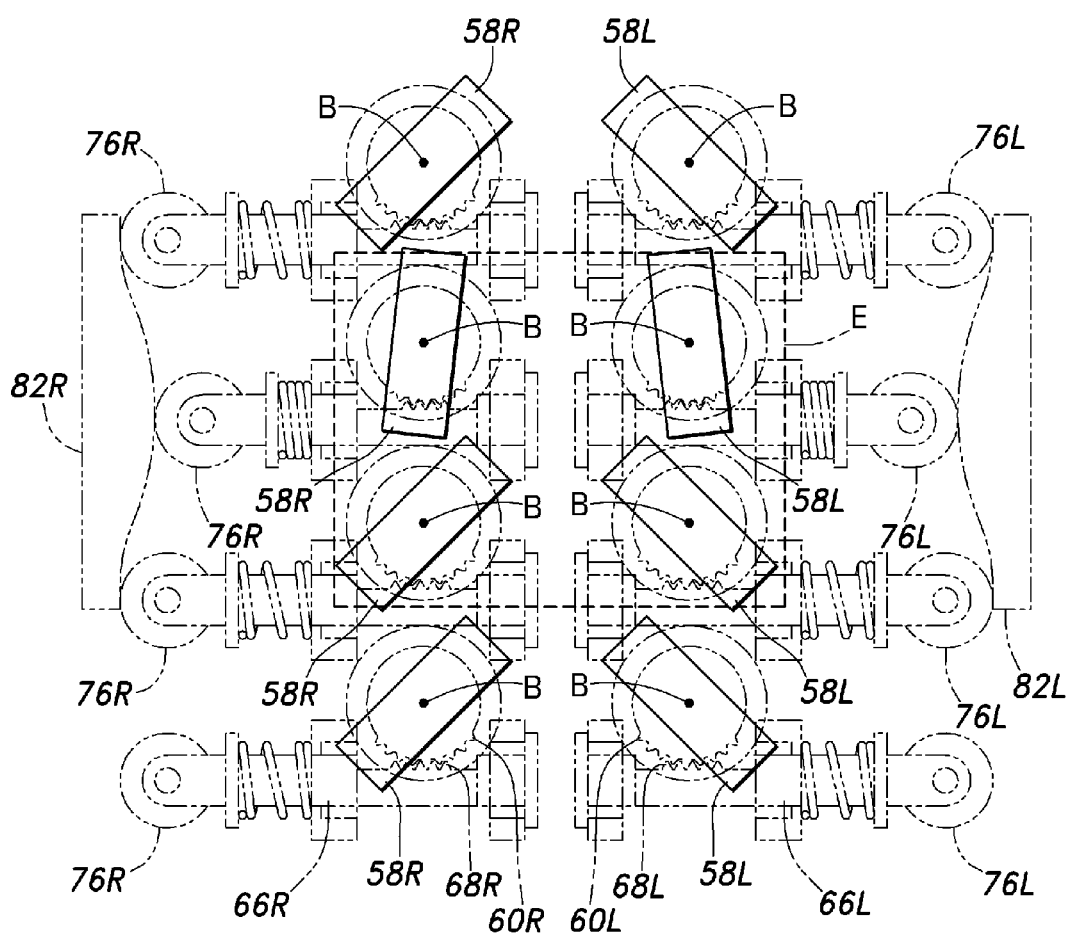
FIG. 6 is a developed view of the mechanism for changing the skew angle of the drive rollers.

In other words, when two or more of the driven rollers 106 within the region indicated by E in FIG. 6 engage the road surface simultaneously, the drive rollers 58 may be given with slightly different skew angles θ depending on the positions thereof with respect to the lower most point of the main wheel 100. Because the rotational speeds of the driven rollers 106 engaging the road surface (imparted thereto by the corresponding drive rollers 58) differ from one another depending on how close to the lost most point of the main wheel 100 the particular driven rollers 106 are located, a yaw moment can be produced at the contact surface between the main wheel 100 and road surface. Therefore, by suitably selecting the configuration of the cam profile, a yaw moment that enables or assists the vehicle to make a turn can be produced.

The cam profile typically consists of a smooth surface including a central convex surface facing the cam follower roller 76 and a pair of convex surfaces facing the cam followers 76 and connected to either end of the central convex surface. A single cam member 82 is provided on each side of the drive unit 40 in the illustrated embodiment. However, two or more cam members may be provided on each side of the drive unit 40.

Figure 7:
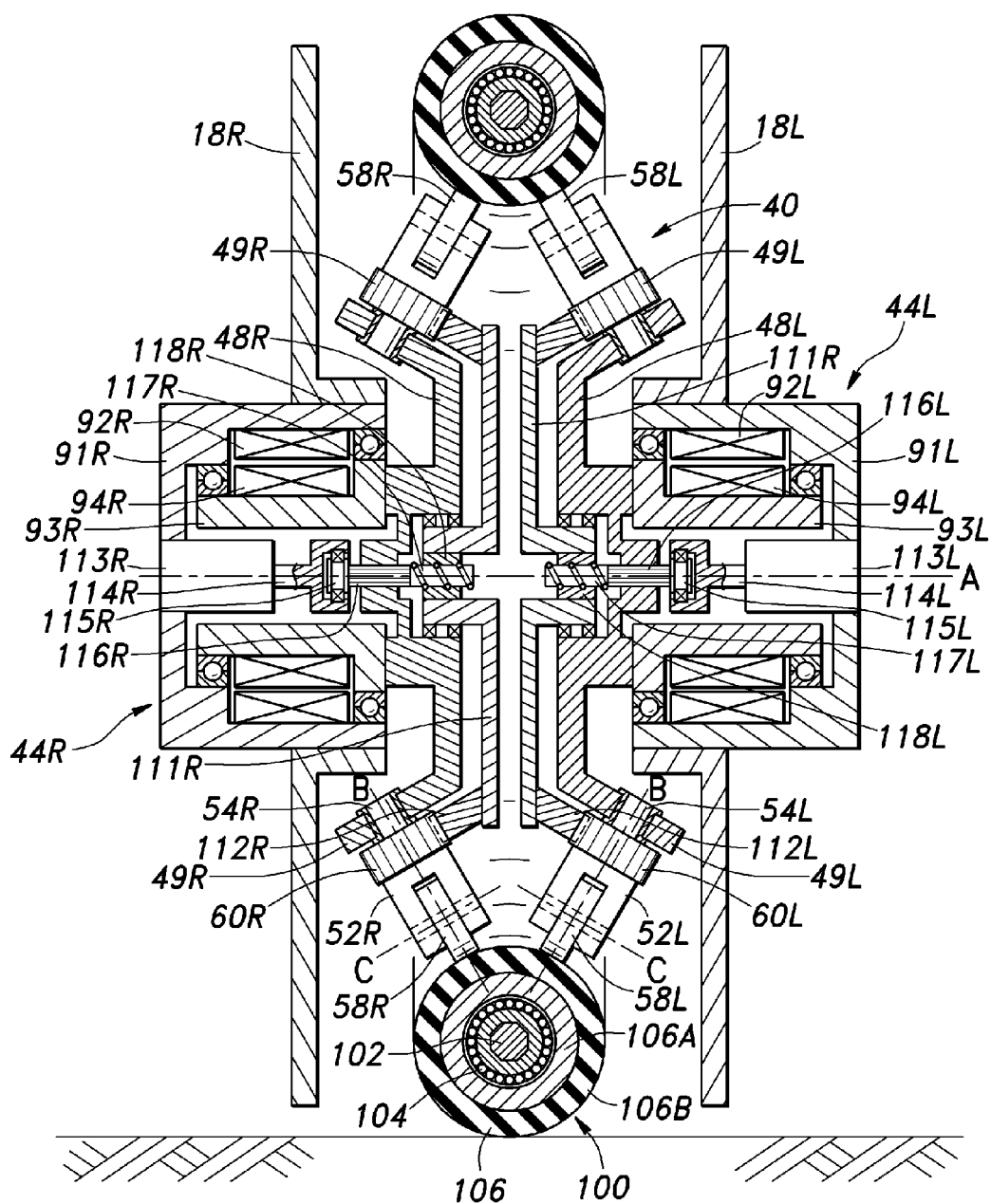
FIG. 7 is a view similar to FIG. 2 showing a second embodiment of the present invention.

FIG. 7 shows a second embodiment of the present invention. In FIG. 7, the parts corresponding to those of the embodiment illustrated in FIG. 2 without repeating the description of such parts.

The electric motor 45 for each drive assembly 44 comprises a motor housing 91 fixedly attached to the corresponding side wall 18, a stator member 92 fixed inside the motor housing 91, a rotor shaft 93 received inside the stator member 92 and rotatably supported by the motor housing 91 and a rotor member 94 supported by the rotor shaft 93 for cooperation with the stator member 92.

The rotor shaft 94 consists of a hollow shaft, and is fixedly connected to the corresponding drive disk 48 in a coaxial relationship. The drive disk 48 includes a conical section 49 that supports drive rollers 58 in a rotatable manner each via a rotary shaft 54 that allows the skew angle θ around the central axial line B to be changed in a similar manner as in the first embodiment.

Each drive disk 48 supports a roller control disk 111 in a coaxial and rotatable manner. A ring gear 112 is formed along the outer periphery of the roller control disk 111 and meshes with a pinion 49 fixedly attached to the rotary shaft 54 or the roller bracket 52.

A linear actuator 113 is received or passed coaxially in the hollow rotor shaft 94 and is fixedly attached to the motor housing 91. The free end of the output shaft 114 of the liner actuator 113 is connected to a slide shaft 116 in a substantially coaxial relationship via a coupling 115 which couples the two parts in an axially fast but mutually freely rotatable manner. The slide shaft 116 is formed with a splined section which is passed through a complementary through hole formed centrally in the drive disk 48 in a rotationally fast but axially slidable manner. The end of the slide shaft 116 remote from the linear actuator 113 is formed with a thread 117 which is threadably engaged by a threaded central opening of the roller control disk 111.

In this arrangement, the slide shaft 116 rotates integrally with the drive disk 48. So does the roller control disk 111 as long as the slide shaft 116 remains fixed in position with respect to the drive disk 48. However, when the slide shaft 116 is linearly actuated by the linear actuator 113, the roller control disk 111 is caused to turn by a corresponding angle relative to the drive disk 48 owing to the threadably engagement between the slide shaft 116 and the threaded central opening of the roller control disk 111. The rotation of the roller control disk 111 in relation to the drive disk 48 causes the rotary shafts 54 to turn, and hence to change the skew angle θ of the drive rollers 52 in a synchronized manner. In this embodiment, the skew angle θ of the drive rollers 52 is changed uniformly and simultaneously for all the drive rollers 52 as opposed to the first embodiment in which the skew angle θ of each drive roller 52 changes depending on the position thereof.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A frictional drive device, comprising
a frame;
a pair of drive disks each rotatably supported by the frame around a central axial line in a mutually opposing relationship;
a pair of first actuators supported by the frame for individually rotatively actuating the drive disks;
a plurality of drive rollers arranged along an outer periphery of each drive disk each via a roller bracket which is rotatable around a center line extending in a radial direction at an angle with respect to the central axial line of the drive disks, each roller bracket rotatably supports the corresponding drive roller so as to be rotatable along a prescribed plane of rotation at a certain angular relationship with the central axial line;
an annular main wheel disposed at least approximately coaxially with respect to the central axial line and engaged by the drive rollers of the drive disks, the main wheel comprising an annular member and a plurality of driven rollers supported along the annular member so as to be rotatable around a tangential line of the annular member; and
a pair of second actuators supported by the frame and configured to selectively turn each drive roller around the center line of the corresponding roller bracket.

2. The frictional drive device according to claim 1, wherein each second actuator comprises a cam member supported by a part of the frame, a cam follower member moveably supported by the corresponding drive disk and engaging a cam profile of the cam member, and a mechanism for converting a camming movement of the cam follower member into a rotational movement of the roller bracket around the center line thereof.

3. The frictional drive device according to claim 2, wherein each second actuator comprises a cam actuator for selectively moving the cam member.

4. The frictional drive device according to claim 2, wherein the mechanism of each second actuator comprises a pinion fixedly attached to the roller bracket and a rack member connected to the cam follower member and provided with gear teeth meshing with the pinion.

5. The frictional drive device according to claim 2, wherein the cam profile is configured such that each drive roller is turned around the center line thereof as the drive roller passes a part of the main wheel engaging an object to be driven.

6. The frictional drive device according to claim 1, wherein each second actuator comprises a ring gear member coaxially and rotatably supported by the corresponding drive disk, a pinion fixedly attached to the roller bracket and meshing with gear teeth of the ring gear, and a ring gear actuator for causing a small relative rotation of the ring gear member with respect to the drive disk.

7. The frictional drive device according to claim 6, wherein the ring gear actuator comprises a linear actuator supported by the frame in a coaxial relationship to the drive disk, and a slide member slidably supported by the drive disk in a slidable manner, and having a first end coupled to an output end of the linear actuator in an axially fast but mutually freely rotatable manner and a second end threadably engaged by a threaded central opening of the ring gear member.

8. An inverted pendulum type vehicle incorporated with the frictional drive device according to claim 1 as a drive unit.

* * * * *